A. WALKER, Jr.

Gas Apparatus.

No. 6,626.

2 Sheets—Sheet 1.

Patented Aug. 7, 1849.

A. WALKER, Jr.
Gas Apparatus.
No. 6,626.
2 Sheets—Sheet 2.
Patented Aug. 7, 1849.
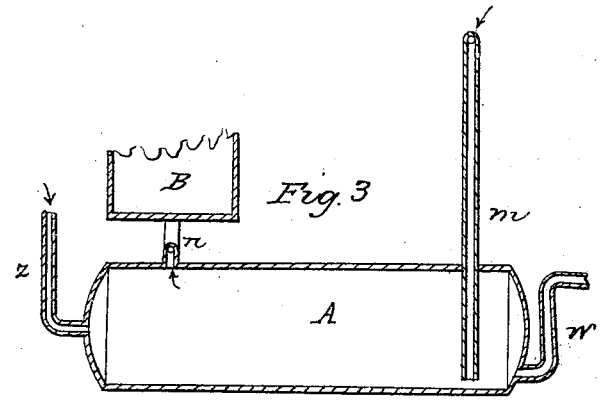
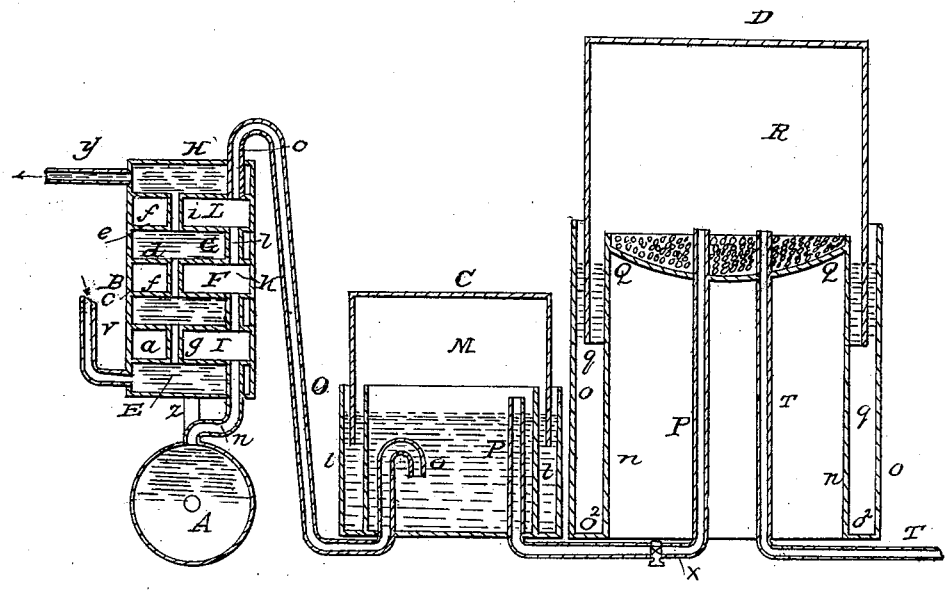

UNITED STATES PATENT OFFICE.

ANDREW WALKER, JR., OF BURKE, VERMONT.

GAS APPARATUS.

Specification of Letters Patent No. 6,626, dated August 7, 1849.

*To all whom it may concern:*

Be it known that I, ANDREW WALKER, Jr., of Burke, in the county of Caledonia and State of Vermont, have invented a new and useful Apparatus for the Manufacture of Gas for Illumination; and I do hereby declare that the same is fully described and represented in the following specification and accompanying drawings, letters, figures, and references thereof.

Figure 1:
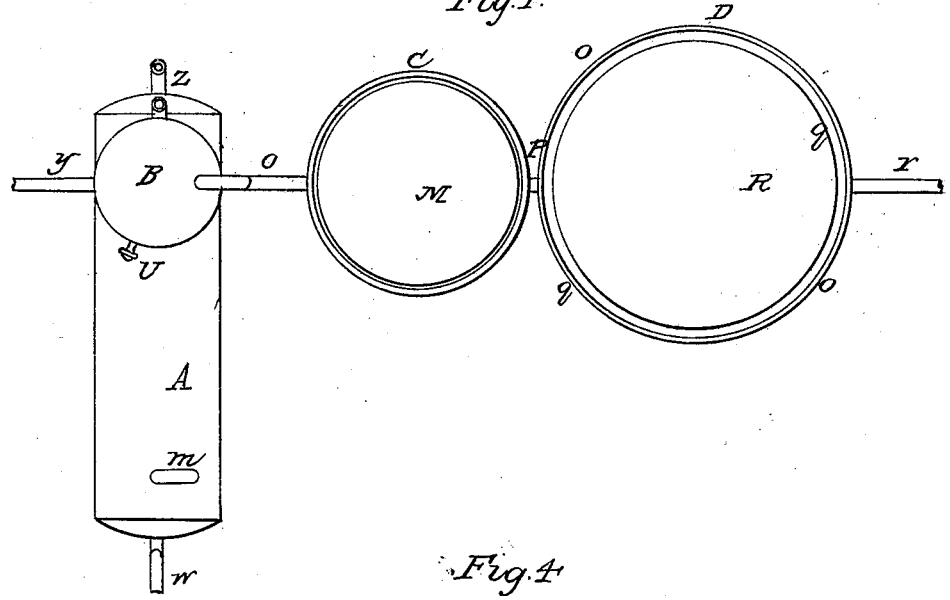
Figure 4:
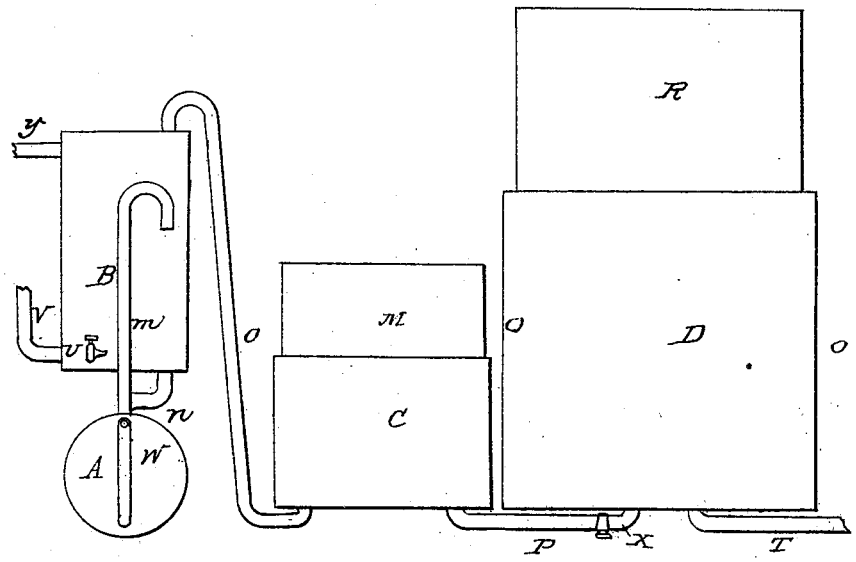

Of the said drawings Figure 1 denotes a top view of my said apparatus. Figure 2 a longitudinal and vertical section taken through the refrigerator purifier and receiving tank or gasometer. Fig. 3 is a vertical and cross section taken through the separator. Fig. 4 is a front elevation of the whole apparatus.

In the said drawings, A represents the separator; B, the refrigerator; C, the purifier, and D the tank or gasometer.

The separator consists of a long horizontal and cylindrical or other proper shaped closed vessel, which while in operation is filled with water. This vessel receives the gas from the retort through a tube $m$, which passes through the top part of it, at or near one end of it and terminates near the bottom, or is made simply to enter the top, according as may be preferred. The gas passes into the water and crosses through it in a horizontal direction and after passing through it, it is made to enter the pipe $n$, which connects the separator and refrigerator. The water which is made to enter the separator through a pipe $z$, opening into its rear end, separates the acid from the gas, the acid being taken up by the water while the gas passes through the water and finally escapes into the refrigerator. The acid and water are removed from the separator by means of a pipe W which is inserted in the separator near its bottom and rises to a height that will cause the separator to keep full of water.

The refrigerator is a vertical, cylindrical vessel closed at its two ends and divided transversely and horizontally (and by partitions $a, b, c, d, e, f,$) into several compartments E, F, G, H, I, K, L.

Those compartments denoted by the letters E, F, G, H, are for holding water, and they are connected with one another by short tubes $g, h, i$. The others, or those marked I, K, L, are for the reception of the gas and exposure of it to the cool surfaces of the plates $a, b, c, d, e, f$, the pipe $n$ being made to lead into the space or chamber I, while the compartments I, K, L, are connected by pipes $k, l$. The eduction gas pipe O passes out of the chamber L and through the water chamber H. After the gas has been thus exposed to the cooling powers of the divisions or plates above mentioned, it passes through the pipe O and into the purifier, which is to be partially filled with water, the pipe being carried upward through the bottom of the purifier, and afterwards curved downward, so as to introduce the gas into the water. The refrigerator is supplied with water through a pipe V introduced into the compartment E, the water being made to pass out of it through an opening $y$ at its top.

The purifier consists of a cylindrical vessel, open at the top, closed at the bottom, and having a concentric wall or partition $l'$ extending around within it, a short distance from and parallel to its sides the space between the said partition and the sides being intended to hold or contain water and to be sufficiently wide to receive within it the hollow cylindrical cover M, whose vertical sides by being introduced into the water make with it a gas tight connection. Within the purifier caustic lime may be suspended on a seive or other proper contrivance placed above the curve of the pipe O. The lime having an affinity for moisture extracts it from the gas should the latter have taken up any from the water of the purifier. This will be found useful in the manufacture of gas from coal, but it may be dispensed with when the gas is made from rosin or oil. The gas when passed through the above named vessels will be freed from all acid. From the purifier the gas is conducted into the receiver or gasometer by means of a pipe P in which there may be a stop cock X, which may be employed to prevent the escape of gas from the receiver, while either the lime or water in the purifier is being changed. The gasometer tank is made of two hollow concentric cylinders $n, o,$ placed the one within the other and united to a bottom $o^2, o^2$. The upper edge of the inner cylinder is connected to a large shallow vessel or cup 2 which is for the purpose of holding caustic or unslaked lime. The pipe P extends up through the vessel and opens into the gas holder R which is an inverted vessel having its lower end made open and inserted in the water space $q, q$. In proportion as the gas accumulates and fills the vessel or gas holder it will rise upward. The gas is conducted to the burners through a pipe T, arranged as seen in the drawings. U is a faucet for the purpose of drawing water from the refrigerator.

The method of separating the acid from the gas by water by causing the gas to flow horizontally over or through water, which is continually running through the separator that is to say which is being made to pass into it at one end of it, to keep it filled and finally to escape out of the other end, is a novel one of effecting the object intended, as the gas is washed by contact with the current of water, and by being made to pass through a long and close vessel, and in contact with a flow or current, in the manner above described; the washing process is very thoroughly accomplished.

What I claim as my invention is,

1. The mode of washing the gas or separating the acid, the same consisting in the employment of a close horizontal vessel and a current of water made to flow through it as specified, and passing the gas into one end of the vessel and water out at the other end thereof, all essentially as specified.

2. I also claim the combination of a lime cistern or vessel with either the gas holder or purifier in manner and for the purpose as above specified, not meaning to claim the use of lime for abstracting moisture, as the same is a well known absorbent.

In testimony whereof I have hereto set my signature this 11th day of May A. D. 1849.

ANDREW WALKER, Jr.

Witnesses:
    WILLIAM DROWN,
    GEO. W. ROBERTS.